April 21, 1964 F. A. SCHWERTZ 3,130,411
ELECTRONIC RECORDER
Filed Aug. 29, 1960 6 Sheets-Sheet 1

INVENTOR.
Frederick A. Schwertz
BY
Stanley Z. Cole
ATTORNEY

INVENTOR.
Frederick A. Schwertz

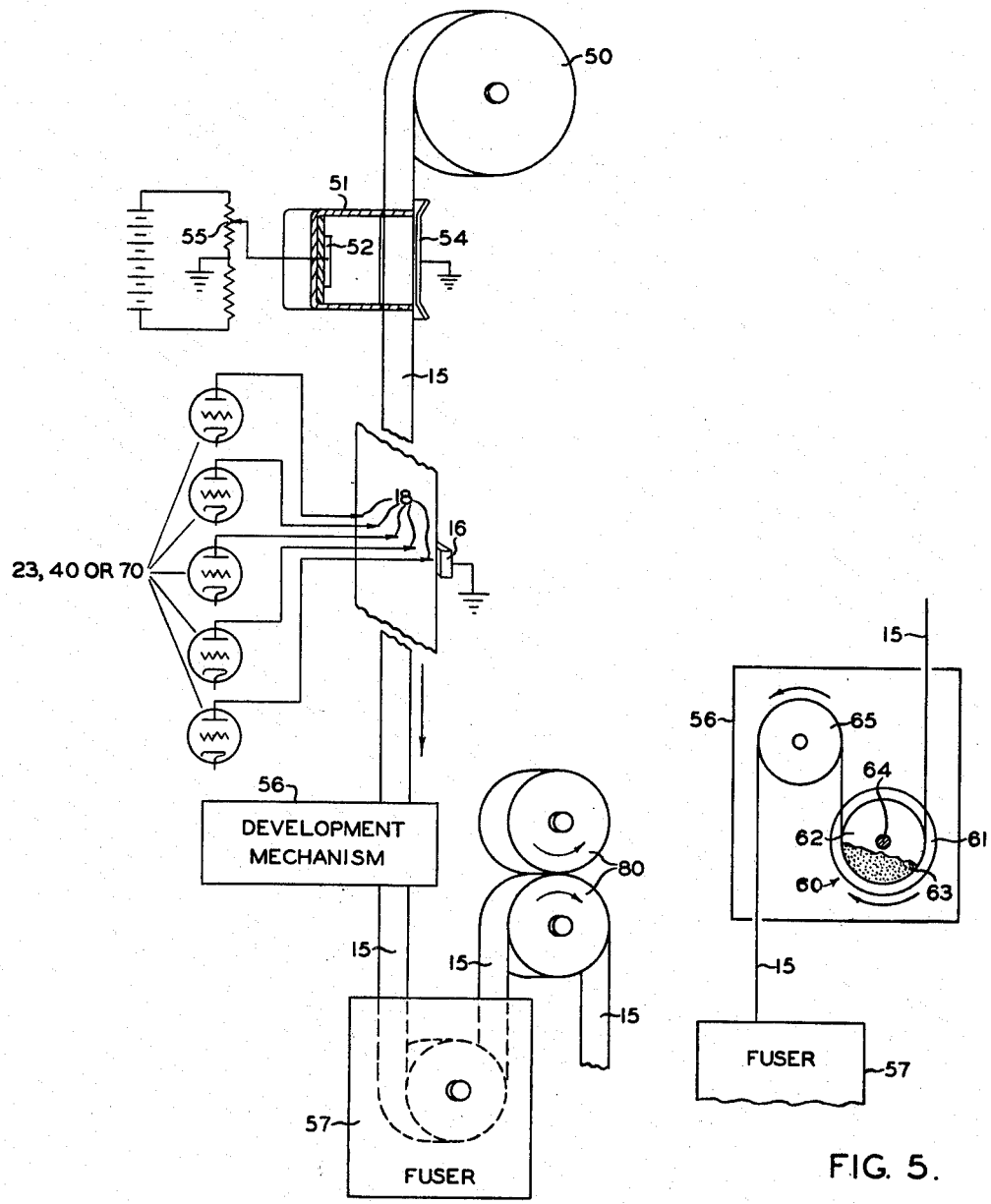

April 21, 1964 F. A. SCHWERTZ 3,130,411
ELECTRONIC RECORDER
Filed Aug. 29, 1960 6 Sheets-Sheet 6

INVENTOR.
FREDERICK A. SCHWERTZ
BY
Stanley Z Cole
ATTORNEY

United States Patent Office 3,130,411
Patented Apr. 21, 1964

3,130,411
ELECTRONIC RECORDER
Frederick A. Schwertz, Pittsford, N.Y., assignor to
Xerox Corporation, a corporation of New York
Filed Aug. 29, 1960, Ser. No. 52,454
10 Claims. (Cl. 346—74)

The present invention relates to a system for visual display of information carried as electrical intelligence in an amplitude- or pulse-time division form; and more particularly involves the electrical analysis of such intelligence, and the presentation thereof as a directly readable and permanent or semi-permanent visual record. This is a continuation-in-part of my co-pending application Serial No. 683,647, filed September 12, 1957.

In the computer, television, and radar arts, for example, there are numerous instances where an entity of intelligence is carried in the electrical phase as a plurality of discrete pulses or different voltages divided on or extending along a time scale. In order to reduce these bits of information into an intelligible entity, they must be presented in accordance with a known plan keyed to the time code or base, and transduced from the electrical form to one that can be directly sensed, such as an aural or visual presentation. In general, the present invention is concerned with a system for electrically identifying each bit of amplitude- or pulse-time division information going to make up an entity of intelligence, and applying the bits into a spatial pattern in accordance with the pre-established time division plan. The invention is also concerned with converting continuous information bearing wave forms to information bits and electrical handling thereof. The system further embraces transducing the spatial pattern of bits into an intelligible visual record of the information entity thus derived. More specifically, the present invention contemplates a movable electrode or a plurality of fixedly oriented electrodes, each intended to carry or present an individual bit of an information entity received by the system. A time referenced electrical analyzer, keyed to the pre-established time base pattern of intelligence reception, is used to selectively energize the moving electrode or the several electrodes in accordance with the bits of information going to make up the entity of intelligence received. Pursuant to one approach of the present invention, the analyzer may function of energize the several electrodes sequentially as each respective bit of information is received; and in accordance with a second approach, the information bits may be stored in the analyzer until an entire entity of intelligence has been received, whereupon all the bits may be simultaneously applied to their respective electrodes, to convey, at once, the entity of intelligence as a whole. With either type analyzer, the information bits appearing at the electrodes are transduced into a visual record by transfer of electrostatic charge from the electrodes to a web or sheet of electrically insulating material, whereby an electrostatic pattern of the information bits is formed on the insulating material. By the selective deposition of a suitable developing material in accordance with the charge pattern carried by the insulating sheet or web, an image of the entity of intelligence presented by the electrodes is developed, to provide a visual presentation of the intelligence received. If desired, the developed image may be further treated to establish a permanent record.

Further, in accordance with this invention, a continuous tone picture or the like carried in the electrical phase as a continuous wave, may be recorded as a charge pattern on the insulating web in half-tone dot pattern form. Further improvements on rapid electrostatic recording systems are also disclosed.

It is therefore one object of the present invention to provide a system for interpreting and visually presenting intelligence received in an amplitude- or pulse-time division form.

Another object of the present invention is to provide a system of the type indicated, where the bits of information presented in amplitude- or pulse-time division form are analyzed and visually presented in a spatial array in accordance with a pre-determined time base key.

A further object of the present invention is to provide a system of the foregoing type, wherein the bits of information are presented in keyed spatial array, sequentially.

Still another object of the present invention is to provide a system as above indicated, wherein the bits of information constituting an entity of intelligence are presented in keyed spatial array, simultaneously.

Still a further object of the present invention is to provide a system of the foregoing type wherein a continuously varying wave form is recorded and visually presented in the form of a half-tone dot pattern.

Other objects and advantages of the present invention will become apparent to those skilled in the art from the following description of several exemplary specific embodiments of the present invention, had in conjunction with the accompanying drawings, wherein:

FIGS. 4 and 5 are schematic illustrations of a recording system for the present invention;

Figure 1:
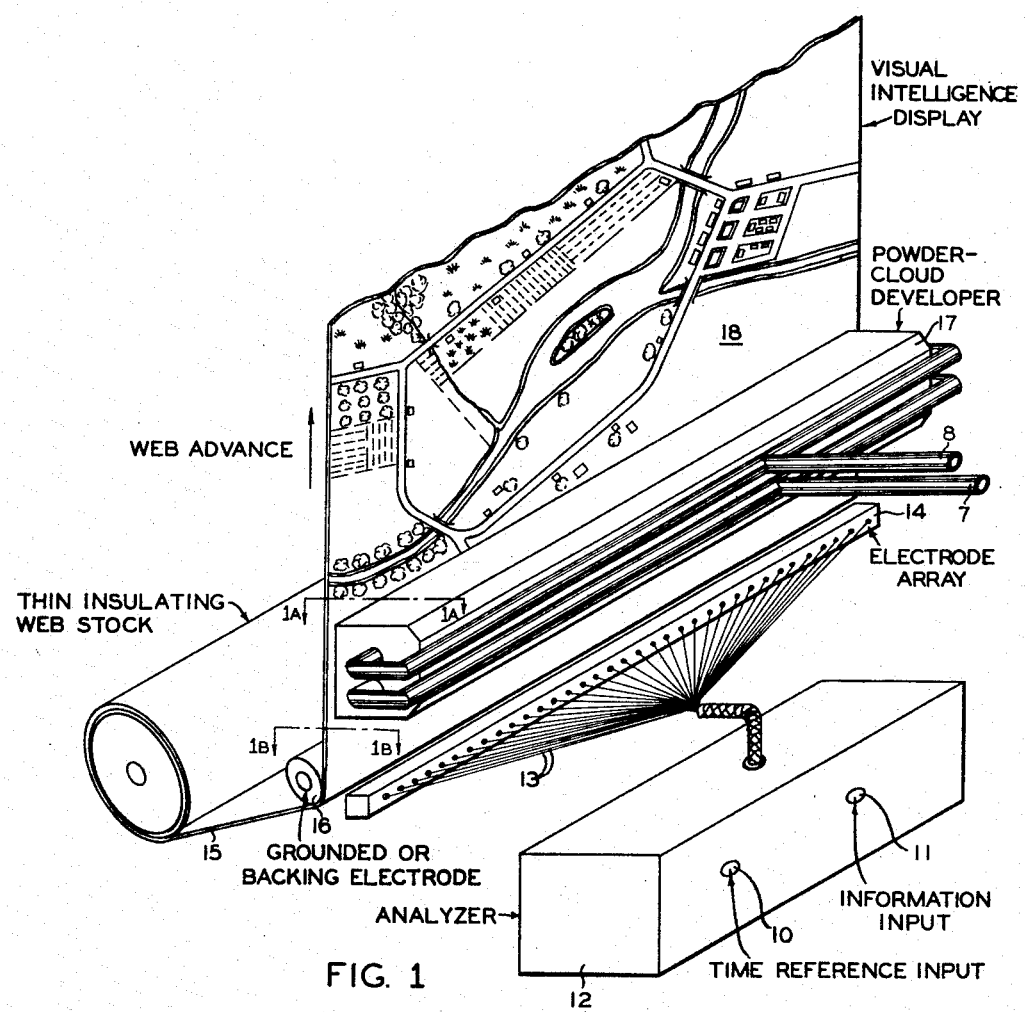
FIGS. 1, 1A and 1B are schematic illustrations of the basic components of the present system.

Referring to FIG. 1, the general organization of the present system is illustrated. As there shown, the system has two electrical inputs, the information input at 11, and a time reference input at 10, both feeding the electronic information analyzer, generally indicated by numeral 12. The output of the analyzer 12 is denoted by a plurality of leads 13 individually connected to respective discharge electrodes, arranged in a desired spatial array within the housing 14. The output of the analyzer 12 as transduced by the electrodes, is in the form of selective and/or varying degrees of electrical discharge from the respective electrodes to a web 15 of thin insulating stock. The discharge pattern adduced by the electrodes at 14 is thus transferred or established upon the section of web 15 juxtaposed thereto, as an electrostatic charge forming a corresponding electrostatic charge pattern. Web 15 is advanced in the direction of the arrows in synchronism with or at a speed related to the input of information to the analyzer, to carry the established charge pattern past a powder cloud developer, or equivalent means, 17. At the developer 17, a powder, ink, or like material is selectively deposited on the web 15 in accordance with the charge pattern carried by the web, to provide a visual display of the intelligence, as generally indicated at 18. As herein depicted for purposes of example, the intelligence presented at 18 is a picture of the terrain of an area of land, as may have been presented at the information input by a radar type of sensing system, or by a television camera tube type of sensing system.

Figure 2:
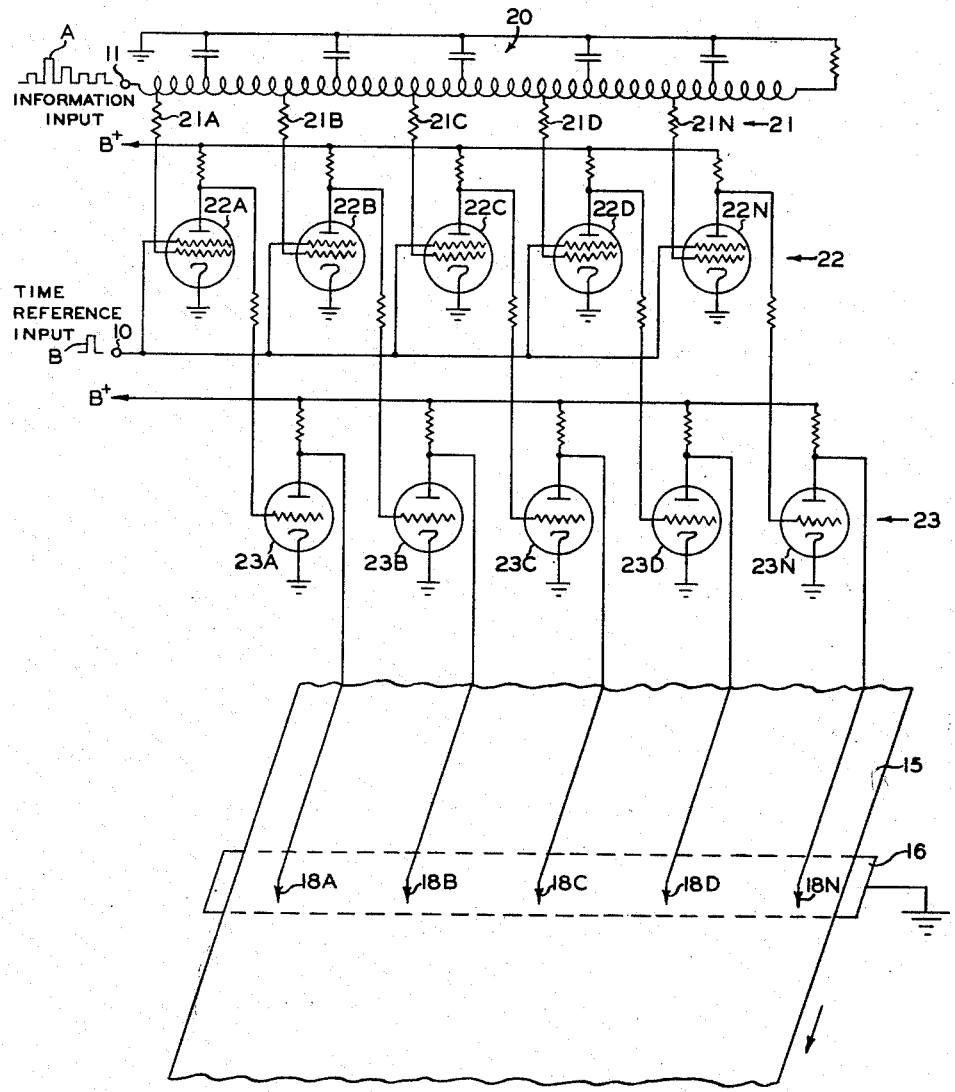
FIGS. 2 and 2A are schematic wiring diagrams of the analyzer, embodying one approach therefor.

Referring more particularly to the analyzer 12, as previously mentioned it is intended to analyze information bits fed thereto in the form of an amplitude- or pulse-time division pattern through input 11, and to correlate these bits into an entity of intelligence through a predetermined time key existing in the pattern of information bits, and established in the analyzer by its circuits, the time reference input at 10, and the spatial array of output electrodes at 14. One embodiment of the analyzer 12 is schematically shown in FIG. 2, utilizing a delay line 20 as the information input circuit, receiving through terminal 11 pulse-time division intelligence, of which one entity of information in electrical form is depicted at A. Delay line 20 is tapped at a plurality of selected points therealong definitive of the time base key of the electrical information, with each tap feeding a respective stage of a bank of gating amplifiers 22 through a corresponding resistor 21. These resistors 21a . . . 21n are chosen with appropriately decreasing values, so as to compensate for signal attenuation along the delay line and enable the voltage values applied to the gates 22 therefrom to have the same relative values as when applied to the line input 11. A time reference signal B is applied to the analyzer through terminal 10, and fed simultaneously to all the stages of the gating amplifier bank 22. The time reference pulse B is keyed to the information input A in such a relationship that a pulse B appears at 10 at each instant that a complete entity of intelligence A appears at the proper position along the delay line 20 to be read out through resistors 21. Thus, when the entire intelligence A is appropriately distributed along delay line 20, a pulse B is applied simultaneously to each of the stages of bank 22.

Each of the gating amplifiers 22a . . . 22n comprises a multi-grid vacuum tube, with the respective delay line tap feeding one grid and the input 10 feeding another grid. The parameters of the gating amplifier circuit are chosen such that each tube 22a . . . 22n is biased below cut off when no signal A or B appears on the grids thereof. The parameters are further chosen such that the application of pulse B alone functions merely to bring the tubes only approximately up to or slightly below the cut off threshold, and the application of pulses A alone, without coincident application of a pulse B, cannot cause the gating amplifiers to conduct. With a pulse B appearing at each of the tubes 22a . . . 22n, then the degree of conduction through each tube becomes a function of the amplitude of that portion of signal A being applied thereto. In order words, the output of each gating tube 22a . . . 22n is a function of that bit of information applied thereto at the instant that the time reference input B is applied to the circuit. In the general operation of this circuit, it will thus be appreciated that a full entiity of intelligence is applied to delay line 20. With this full entity thus in the circuit, a time reference pulse B is applied, resulting in the gating amplifiers 22 passing simultaneously and separately each information bit composing signal A. This entity of intelligence having been thus read out of the delay line, it proceeds to pass off the delay line as a second entity begins to appear at 11 and pass down the delay line. At an appropriate time, the first entity has passed off the line, the succeeding entity is in position to be read out, and a next pulse B is applied at 10 to read out at once the latter entire entity of intelligence. Obviously, the production of time reference pulses B must be appropriately keyed to the circuitry presenting the information A to the delay line. The means for accomplishing this end will be readily apparent to those skilled in the art, and since it forms no part of the present invention, the circuit therefor is not shown.

The plate outputs of gating amplifiers 22a . . . 22n are applied to the grids of corresponding respective amplifiers 23a . . . 22n, comprising the amplifier bank 23. Since with no output from gates 22a . . . 22n their plate potentials are at a maximum positive value, the normal state of amplifiers 23a . . . 23n is at maximum conduction, placing their plate outputs at a minimum positive potential. The plate outputs of amplifiers 23a . . . 23n are applied to respective discharge electrodes 18a . . . 18n, and the parameters of the system are chosen such that this minimum potential places the discharge electrodes at their effective discharge threshold, or slightly therebelow, with respect to the ground plate 16. Therefore, when, and only when, the gating amplifiers 22a . . . 22n are passing an information output, resulting in an increase in the plate output potentials of corresponding amplifiers 23a . . . 23n, do the corresponding electrodes 18a . . . 18n effect an electrical discharge appropriate for producing a corresponding electrostatic charge on insulating web 15. The resulting electrostatic charge pattern on web 15 is thus a record of the entity of intelligence applied at 11. Since the magnitude of output of each amplifier 23a . . . 23n is made a function of the amplitude of the corresponding input pulse of signal A, the density of the resulting charge established by the corresponding electrode is a function of said pulse amplitude; hence, the system is capable of obtaining half tone definition in its intelligence record.

By an appropriate selection of the spatial array of electrodes 18a . . . 18n relative to the time relation of information bits contained in signal A, the resulting electrostatic charge pattern on web 15 may be a directly intelligible form of information. This charge pattern, to be readable, must of course be rendered visible by development, as will be described subsequently. In the present embodiment, the entity of intelligence to be adduced on web 15 is a line of scan of an area of terrain, as derived in electrical form by radar or television scan, for example. Accordingly, the correlation of the spatial arrangement of electrodes 18a . . . 18n with the time pattern of the information bits contained in the signal A is one requiring a linear array of the electrodes across web 15. It is apparent, however, that with different forms of intelligence, such as an alphabetical or numerical intelligence, the array of the electrodes would be different. Once having appreciated and understood the principles of the present invention from the foregoing specific embodiment, the selection of an appropriate array of electrodes for any particular purpose will be readily apparent to those skilled in the art.

In connection with the foregoing specific embodiment of the analyzer, it should be pointed out that, if desired, the information and time reference inputs could be reversed; that is, the time reference pulses B could be applied to the delay line 20, and the information input signals applied directly and simultaneously to all the gating tubes 22a . . . 22n. In this instance, the pulse B would travel down the delay line to condition each tube 22a . . . 22n in sequence. Synchronized with the pulse B, the information pulses contained in signal A would in sequence be each applied to all the gating tubes in the bank 22. By this mode of operation, it is apparent that each gating tube would have an output only in response to that information bit to which it is intended to respond, since with the appearance of each information pulse, only the appropriate tube 22a . . . 22n would be conditioned to respond by the time reference pulse on delay line 20.

Figure 2A:
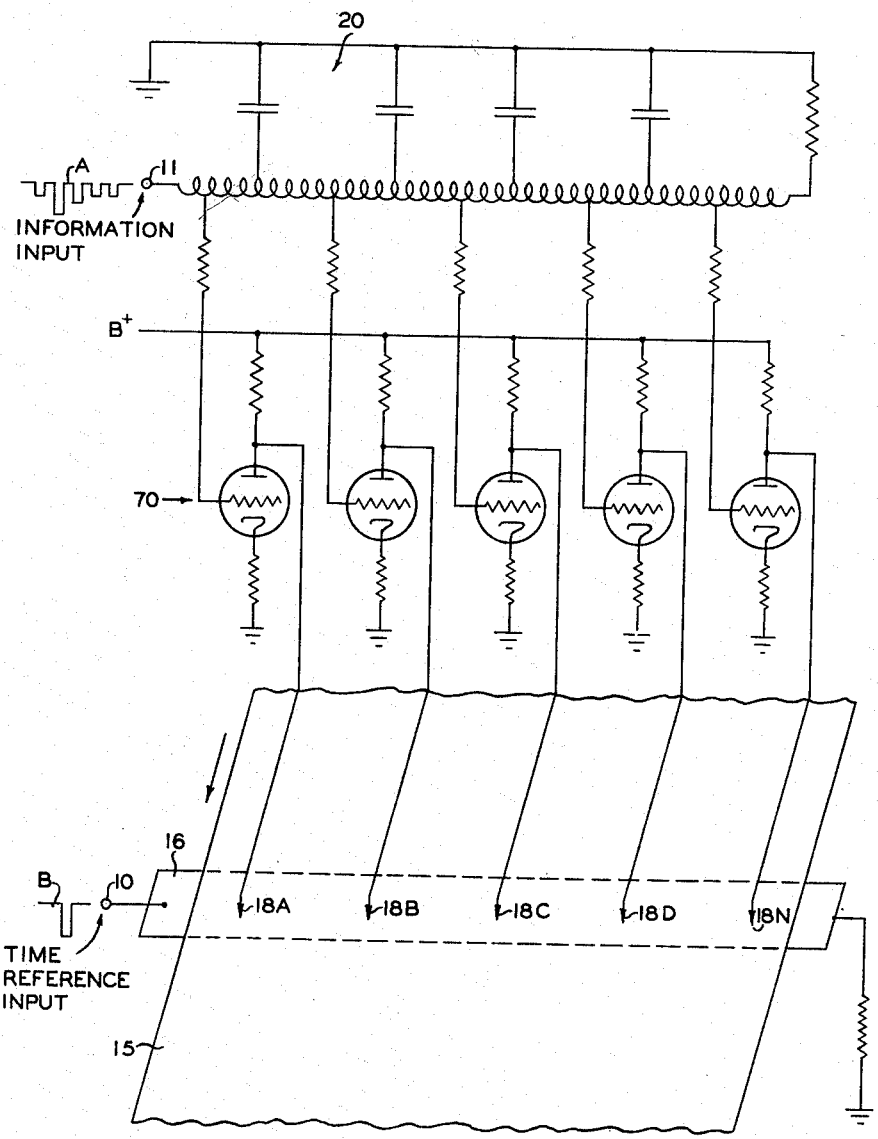

A simplified modification of the delay line system of FIG. 2 is shown in FIG. 2A. Here the intelligence information A in negative pulse form is applied along delay line 20, and amplified at 70 to provide at electrodes 18a . . . 18n a pattern of voltages proportional to the incoming intelligence in signal A. Synchronized with the intelligence signals, and when a complete entity of intelligence is present and appropriately positioned on the delay line, a negative time reference pulse is applied to the backing electrode 16, to cause the electrodes 18a . . . 18n to discharge with intensities related to the respective information bit pulses of signal A. The negative pulse B should itself be of a magnitude sufficient to place the electrodes 18a . . . 18n at approximately their discharge potentials in the absence of a signal A, whereupon the resultant discharge of an electrode 18a . . . 18n would indicate the presence of an information bit pulse thereat, and the intensity of charge established on web 15 at such electrode would indicate the amplitude of that information pulse.

Figure 3:
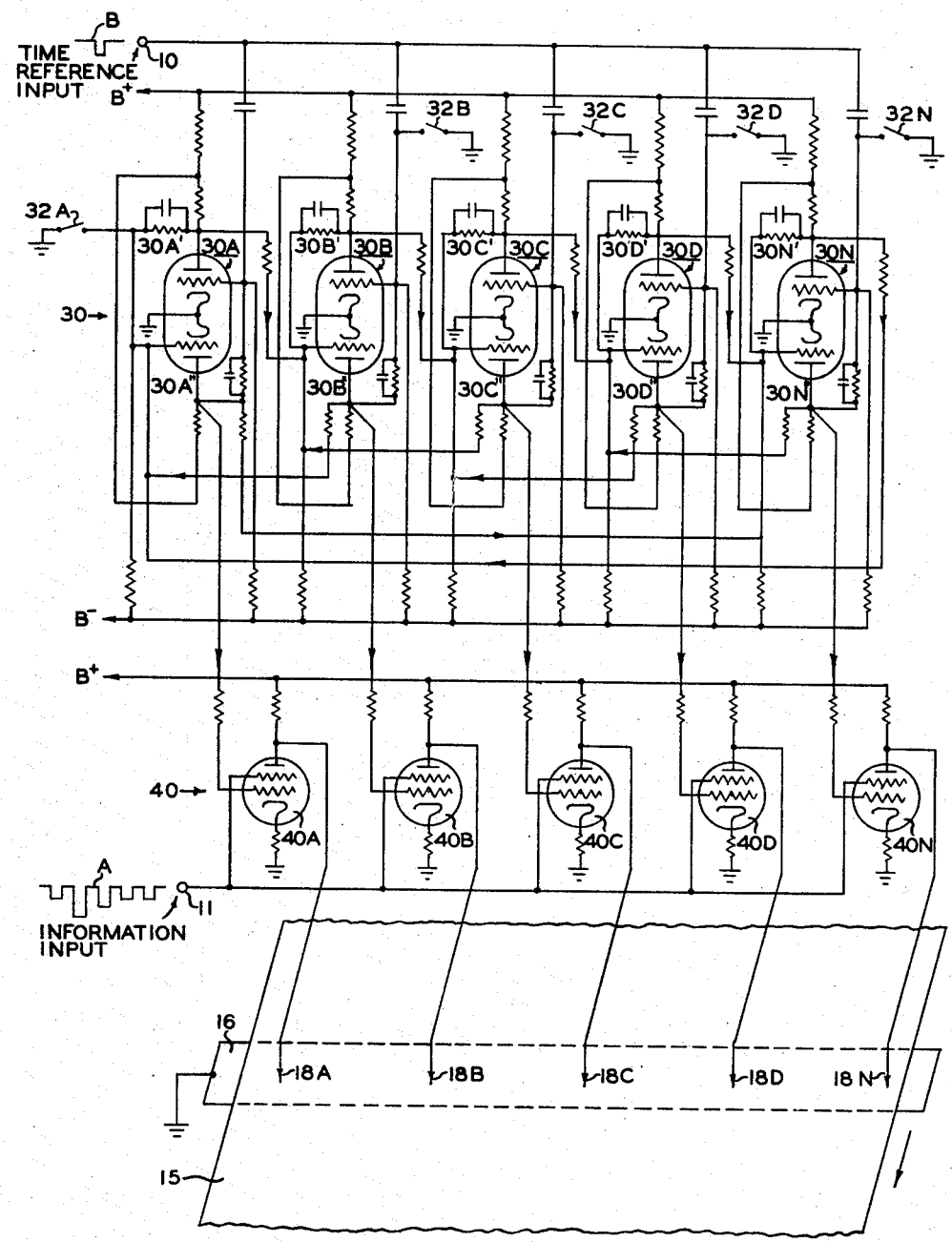
FIG. 3 is a schematic wiring diagram of the analyzer, embodying a second approach therefor.

A further embodiment of analyzer 12 is shown in FIG. 3, and basically comprises a ring counter chain 30 operating to condition gating amplifiers in bank 40 sequentially. As thus conditioned, the gates operate to pass appropriate information bits contained in signal A at input 11 to corresponding discharge electrodes 18a ... 18n.

The ring counter chain 30 may be of any suitable design. For purposes of illustration, one such chain is schematically shown in FIG. 3, and is of the type more fully disclosed and explained in U.S. Patent 2,402,432, issued to Robert E. Mumma on June 18, 1946. This ring counter chain including a plurality of stages 30a ... 30n, each of which comprises a vacuum duo-triode, or pair of triodes, interconnected to function basically as a flip-flop circuit. In order to establish an initial condition for the chain, each flip-flop stage is provided with a mechanical switch 32a ... 32n. With the supply potentials applied, when said switches are simultaneously and momentarily closed an initial condition is established wherein triode 30a" is conducting with triode 30a' cut off, and triodes 30b" ... 30n" are cut off with triodes 30b' ... 30n' conducting. The switches are then opened, and the counter chain is ready to function.

With the first negative time reference input pulse B applied at terminal 10, each of the grids of 30a' ... 30n' is driven negatively. This has no effect on 30a' which is already cut off, and the magnitude of the pulse is chosen as insufficient to override the negative biases on tubes 30c" ... 30n" to the extent necessary to flip these stages. However, because of the relatively positive bias on tube 30b" due to the feed thereto from relatively positive plate or cut off triode 30a', the pulse B is sufficient to flip stage 30b. When 30b flips, the plate of triode 30b" goes from cut off to conduction, causing the plate potential thereof to go in a negative direction. Since the negative going plate potential of 30b" is fed back to the grid of triode 30a", triode 30a", which had been conducting, is moved toward cut off sufficiently to cause stage 30a to flip. Thus, the count has moved one stage down the ring. In a like manner, each subsequent pulse B moves the count one stage down the chain; and since the chain is connected in ring formation, the pulse B following the count at stage 30n places the count back at stage 30a.

At the outset it was noted that triode 30a" was conducting, and triodes 30b" ... 30n" were cut off. Thus, the counter output from the plates of 30a" ... 30n" to the bank of gating amplifiers 40 is, at stage 30a, relatively negative and at stages 30b" ... 30n", all relatively positive. At each count of pulses B, the one relatively negative output is moved down the chain one stage, while the preceding stage is returned to a relatively positive output.

The outputs of the counter chain stages are coupled respectively to one grid of the multigrid gating amplifiers 40a ... 40n. The negative information signals A at input 11 are coupled simultaneously to another grid of all the gating amplifiers. The plate outputs of the gating amplifiers are in turn coupled respectively to the discharge electrodes 18a ... 18n. The parameters of the gating amplifiers 40a ... 40n are chosen such that a relatively negative output from the counter chain alone reduces conduction through the respective gate sufficiently to raise its plate output approximately to the effective discharge potential of the respective discharge electrode. The occurrence of a negative going information bit pulse from intelligence signal A also causes a reduction in conduction through the gates 40a ... 40n, resulting in a discharge from the electrode 18 corresponding to the count existing on chain 30, to the web 15 and ground plate 16. The intensity of this discharge is thus approximately related to the magnitude of the information bit pulse. The parameters of the gating circuits are further established, and the magnitude of information pulses A are limited, such that for any gating stage coupled with a relatively positive output counter stage, the negative information pulses cannot lower conduction through said gating stage sufficiently to cause the plate output to pass the effective electrode discharge threshold. Consequently, each information bit is "printed out" by electrical discharge at that electrode only which is appropriate, as established by the keying of time reference pulses B with the application of intelligence to the gating amplifiers 40a ... 40n. By means well known in the art, and forming no part of the present invention, the sequence of time reference pulses B can be readily synchronized with the information bit pulses, to step the counter 30 one count for each information bit. A run through the entire sequence of discharge electrodes thereby provides, through their spatial array, a presentation of an entity of intelligence upon the web 15, as will be understood from the description heretofore presented in connection with the analyzer embodiment shown in FIG. 2.

Such a device is particularly adaptable to high resolution strip radar recording. Thus, if the radar is scanning an area of 40 miles, the recording interval will be $4 \times 10^{-4}$ seconds. In this time interval a megacycle ring counter will record 400 counts. Since this is about the number of electrodes required per lineal inch, a 5-inch recording field would call for a 5 megacycle counting rate. Even wider strips may be used, if desired, as transistor ring counters have been operated at frequencies up to 100 megacycles per second.

With reference to FIGS. 4 and 5, there is presented the principles of, and an exemplary mechanism for, transducing into visual form the electrical intelligence obtained at the outputs of amplifiers 23 in FIG. 2, amplifiers 70 in FIG. 2A, or gating amplifiers 40 in FIG. 3. The thin electrically insulating web 15 drawn from supply roll 50 may be a plastic film, such as polyethylene terephthalate, polystyrene, cellulose acetate, ethyl cellulose, or like sheet material of good insulating properties, and preferably of the order of one or two mils thick; or it may be of paper coated on the working surface with one of these plastics, or with a wax; or in some instances thoroughly dry paper or cellophane can be used. As the web 15 is drawn from its roll, it first passes through a preliminary charging device 51, where the web is brought to a uniform state of electrostatic charge. From the preliminary charger, the web is then passed between the information transducing discharge electrodes 18 adjacent one surface of the web, and the ground plate 16 adjacent the opposite surface, where an electrostatic charge pattern depicting the intelligence is adduced on the web. The web then enters a development mechanism 56, where the electrostatic charge pattern on the web is rendered visible by the selective application of a finely divided material, such as electroscopic powder, or a liquid ink, or like material. As the web emerges from the developer, the intelligence carried thereon is visually intelligible, as indicated on web section 18 of FIG. 1. Where a permanent record of the intelligence is desired, the web is then passed to fuser 57, where the powder is permanently fused to the web, or the ink is dried. As is apparent, if only a transitory presentation of the intelligence is desired, the fuser may be omitted, and instead of a fresh web supply roll, the web may be in the form of an endless belt, with means interposed between the developer 56 and the preliminary charger 51, on the return side, to clean the intelligence off the web.

The purpose of preliminary charger 51 is to establish over the web a uniform electrostatic charge preparatory to receiving the intelligence charge pattern. Charger 51 comprises a housing within which is located an electrode 52 coated with a radioactive source of ionizing particles, such as a polonium layer, which faces one surface of the web. The opposite surface of the web 15 is contacted by a ground plate 54, while voltage source 53 as tapped by a potentiometer 55 is connected to the electrode 52.

The potentiometer 55 is center-tapped to ground, and the battery or voltage source 53 is preferably of one hundred to several hundred volts. By varying the potentiometer setting, one can thus establish a field of either polarity and of adjustable intensity between electrode 52 and web 15.

The alpha or other ionizing particles emitted by the radioactive layer on electrode 52 produce ionization of the air in the chamber 51 into negative and positive ions, and these ions migrate in opposite directions, depending on their polarity, under the influence of the electrostatic field existing between electrode 52 and plate 54. As ions of one polarity deposit their charge on web 15, the field becomes altered by the charge on the web until a state of equilibrium is reached, in which the potential of the web surface is equal to the potential applied to electrode 28 by the potentiometer. Whether a small positive potential or negative potential is applied to the web, as controlled by the setting of the potentiometer tap, depends on factors subsequently considered. In some instances the electrode 28 may be held at ground potential, in which case the device merely serves to remove incidentally acquired electrostatic charges from the web in preparation for receiving the electrostatic intelligence charge pattern. Instead of a radioactive source of ionizing particles, the electrostatic charges may be supplied by corona emission as disclosed, for example, in U.S. 2,777,957 to L. E. Walkup.

With the web 15 thus prepared, it passes between discharge electrodes 18 and ground or backing plate 16. The backing plate 16 may be a flat plate as shown in FIG. 4, a roller as shown in FIG. 1, a knife edge, etc. The web is preferably held in contact with the base plate 16, but spaced by a very small gap, of the order of 2 to 3 mils, from the discharge electrodes 18. Under these conditions, and using a potential difference of about 750 volts between backing plate 16 and electrodes 18, a silent or field discharge occurs between the energized electrodes 18 and the surface of the web, establishing a controllable and localized electrostatic charge on the web opposite the energized discharge electrode. The polarity of electrostatic charge on the web is, of course, determined by the polarity of the discharge electrodes.

The web 15 now carrying the intelligence in electrostatic charge form, passes into the developer 56, shown in detail in FIG. 5. This device comprises a pair of rollers 60 and 65. Roller 60 includes a central bearing shaft 64 carrying a pair of axially spaced disks 62 over which the web edge peripheries pass. Flanges 61 confine the web in place on disks 62. The web and disks 62 thus form a hopper in which a supply of electroscopic powder 63 is contained. It is preferable, although not necessary, that the powder 63 be charged by triboelectric or other means to carry an electrostatic charge opposite from that established on the web by the transducing discharge electrodes 18. The powder adheres in the areas charged by electrodes 18, to produce a visible presentation of the intelligence carried by the web. As the powder 63 is tumbled over the web 15, if the initial preliminary charging of the web at 51 were of a polarity opposite from that at the electrodes 18, then this background charge on the web would be of the same polarity as the charged powder, and would assist in repelling the developer powder from this background area. After being developed, the web passes from roller 60 up over roller 65, and down into fuser 57. In fuser 57 the web passes about roller 58 where it is heated to a temperature sufficient to fuse the developer powder to the web, or, if ink were used as the developer, to dry the ink thereon, thus forming a permanent visual and directly readable record of the intelligence transduced at electrodes 18. The web may then pass between suitable drive rolls such as 80.

Figure 1A:
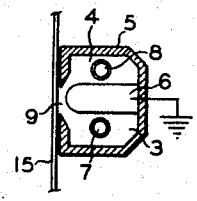

The described method of rendering the pattern of electrostatic charges visible, i.e., developing the images, is known as "loop" development. This system is disclosed in U.S. 2,761,416 to C. F. Carlson. The method of development is not critical in the instant invention and other methods for contacting electrostatically charged marking particles with the electrostatic latent image may be used. Thus, a spray of electrostatically charged liquid droplets or dry powder particles, as disclosed in U.S. 2,784,109 to L. E. Walkup may be used or magnetic brush development described in U.S. 2,791,949 to Simmons and Saul are all operable. A powder cloud development apparatus particularly suited for use as element 17 of FIG. 1 is the device known as a slot development apparatus more particularly described in U.S. patent application S.N. 485,408 filed February 1, 1955, by C. F. Carlson. As can be seen in FIG. 1A, the device includes a chamber running the width of image member 15 and formed by walls 5, the chamber being divided into an entrance chamber 3 and an exit chamber 4 by conductive electrode 6 which is positioned under aperture 9 in walls 5 directly opposite in close, spaced relationship to image member 15. The distance between member 15 and electrode 6 is no more than about 1/8-inch and desirably is no more than about 1/40-inch. At these spacings electrode 6 draws the lines of force of the electrostatic image externally above the surface of member 15. Electrostatically charged marking particles as from a powder cloud generator enter chamber 3 through entrance means 7 and are channeled by walls 5 to flow around electrode 6 into chamber 4 and thence through exit means 8 to a collecting box, or other disposal means. While passing through space 9, the particles are attracted to the electrostatic image and deposit thereon to render an accurate, visible reproduction thereof all as more fully and completely described in the said application of C. F. Carlson. Devices such as this have been made wherein the development system is limited to 1/4-inch thereby making possible almost instantaneous viewing of the developed image. The choice of the particular developing process or apparatus would be dependent on the combination and design limitations imposed in assembling the machine for a particular operation.

Similarly, the means of permanently affixing the powder image to the backing material is not critical in the instant invention. Thus, if no permanent image is desired, after examination of the roll, the loosely adhering powder image may be wiped off as by swabbing with cotton and the roll reused. If a permanent record is desired, the powder particles may be rendered adherent to the backing material by heating, as previously disclosed herein, by contacting the powder-bearing sheet with the vapors of a solvent for the marking particles or for a resin coating on the image receiving member as disclosed, for example, in U.S. 2,776,907 to C. F. Carlson. Where liquid droplets are used, absorption of the liquid into the capillaries of the backing member or an evaporation of the liquid would serve to affix the image to the image receiving sheet. Other means of affixing the powder image, as by the use of pressure, by spraying with a fixative liquid, etc., also may be used if desired.

The apparatus of the instant invention is unrivaled in the versatility of operation made available. The device accurately records a series of time dependent electrical pulses while faithfully preserving the time relationship in terms of accurate spacing on the recording medium. Any type of information presented in terms of electrical pulses may be printed by the instant device, including such widely variant examples as alphanumerical characters, abstract symbols of any type such as mathematical, chemical, etc., audio signals and so on up to very high quality half-tone reproductions equal or better in quality to that obtainable in present radar and TV presentations. The number of electrode elements per linear inch in the electrode array will depend on the number of bits, i.e., the fidelity, of recording which it is desired to obtain.

Figure 1B:
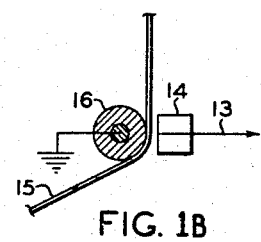

A number of interrelated factors determine the quality of reproduction obtainable in the instant device. One of these elements is the gap spacing, that is, the distance between the recording member and the electrode array. As can be seen in FIG. 1B, the array may be designed so that the electrodes are flush with the outer surface of array 14. This permits rigidity of construction for fine electrodes and accurate spacing of the gap without affecting the efficiency of electrostatic transfer. In general, it has been found that the electrostatic potential required for charge to transfer across an air gap is dependent on the width of the gap for any given electrostatic system. This potential reaches a minimum in the neighborhood of a particular spacing which is generally in the range of 10 to 30 microns. For shorter gaps the voltage required for charge transfer increases asymptotically so that at spacings of about 2 microns charge transfer becomes virtually impossible in any practicable system. As the air gap increases, the potential required for charge transfer also increases but at a more gradual rate than when the gap is decreased in width from this minimum value. However, increasing gap width results in spreading and loss of resolution of the electrostatic image transferred to the transfer member. In general, spacings of from about 5 to about 150 microns may be used with a particular preferred range of gap width being from about 15 microns to about 100 microns. Shorter spacings place additional and unnecessary strain on the mechanical design of the system to assure the reliability of gap spacing and increase the voltage required for reliable electrostatic transfer. The practical limit on the upper side for the gap spacing is largely determined by the image quality desired. The spacings given herein are practical limitations for obtaining good quality reproduction.

The minimum potential required to obtain charge transfer across an air gap will be slightly greater than the breakdown potential of air for the air gap used. In general, the determining factor is the relationship of the transfer member compared to the capacitance of the discharge electrode to ground. Representative values required to initiate charge transfer are within the range of 600 to 1,000 volts.

In order to simplify the design of the pulse circuitry a "bias" may be applied to the air gap by placing a constant D.C. potential between the backing electrode 16 and the discharge electrodes 14 which voltage is close to but insufficient in magnitude to initiate charge transfer. The use of a bias has the disadvantage of sweeping ions from the gap so that when the pulse is applied it must be of greater magnitude than simple addition to the bias potential would indicate if reliability of discharge is to be assured for short pulses.

Only the voltage over that required to initiate breakdown is transferred across the gap. Thus, if the air breakdown potential is −800 volts and we apply a potential of −1,000 volts to the gap, only about −200 volts would be transferred.

A second factor affecting discharge is the width of the pulse applied to the discharge electrode. Increasing the magnitude of the applied voltage will improve reliability. However, care must be taken not to transfer excessive charge to the transfer member as Lichtenberg figures appear in the developed image. Lichtenberg figures are due to the inability of the surface of the transfer member to sustain the lateral potential gradient. Breakdown, therefore, occurs on the recording surface and the charge spreads laterally. On development, this spreading of charge manifests itself in image deformities referred to as Lichtenberg figures, or "treeing." For pulses of 10 microseconds or longer duration, breakdown occurs reliably. Down to about 5 microseconds, there is a decrease in reliability but the system still operates satisfactorily. As pulse width decreases below this value, reliability drastically falls off. The electrostatic discharge itself takes at least about 0.01 microsecond and this sets a definite lower limit on pulse width. It has been observed that negative polarity pulse voltages permit the use of significantly higher pulse voltages without "treeing" than if positive polarity pulses are used.

It is advisable to use pulses of far greater magnitude than required to transfer merely the minimum charge sufficient to give powder images of adequate density. Depending on the development system used, a potential of as little as 50 volts or less will give a readable image. However, in practical operation of the system, excellent results are obtained using a bias on an 80 micron air gap of −1,000 volts with pulses of −500 volts. For short pulses (2 microseconds or less) a pulse voltage of −1,000 has been used without "treeing" or objectionable deterioration in image quality.

Reliability of discharge on application of the voltage pulse can be further improved by increasing the number of ions in the air gap. The breakdown of the air gap by a short voltage pulse is, of course, dependent on the statistical fluctuations of the quantity of ambient ionization in the gap. Increasing the ambient ionization therefore increases the reliability of breakdown on the application of the short voltage pulse. One method of doing this is to irradiate the gap with ultraviolet light.

The output impedance of the circuit employed to pulse the air gap is of particular importance: the lower the output impedance the greater the reliability of image formation in the situation where electric fields of moderate strength are applied to the gap. For example, in the very simplest situation where the air gap is connected in series with a switch, a resistor, and a battery, image formation can be "throttled" through the use of a high impedance resistor. In general, the resistance should not be greater than about 100,000 ohms and it is preferred to have it as low as possible. The discharge electrode may be connected directly to B+ in the output circuit wherein B+ acts as a partial bias on the air gap. If a blocking condenser is used in the discharge circuit, it must not be so small as to present an impedance high enough to "throttle" the discharge. Thus, for 2,000 volts on an 80 micron gap, the condenser in series with the electrode should be at least 40 micromicrofarads and preferably is 100. The use of a blocking condenser may also be helpful in preventing "treeing." Where a bias is used, at least part of the bias potential should be applied to the backing electrode 16. It has been found that discharge is facilitated if neither the discharge nor backing electrode is grounded. An alternative method of biasing the gap is to apply a uniform electrostatic charge to the insulating transfer member as shown in FIG. 4.

Finally, handling of the transfer member almost necessarily produces random electrostatic charges thereon due to a variety of causes such as triboelectrification, etc. Unless steps are taken to nullify these random charges, they will be developed to give spurious results interferring with the legibility of the desired information. Accordingly, it is desirable to provide suitable means for eliminating these charges. This can be done by a variety of means known to those skilled in the art, such as providing an A.C. controlled corona discharge just prior to the passage of the transfer member through the charge transfer station between the electrode array 14 and backing electrode 16 shown in FIG. 1.

While the invention has been discussed herein in terms of controlled electrostatic discharge across an "air" gap, it is understood that any type of gas may be used which is not corrosive under the conditions of use. Thus, nitrogen, argon, carbon dioxide, etc., may be used in the gap.

While the invention has thus far been discussed primarily in terms of recording and presenting information in the form of a characteristic pattern of pulses, it may also be adapted to the recording and presenting of information in the form of a continuously variable wave form. Such applications are common in the facsimile and television arts where the transmission of continuous tone pictures or images is involved. Thus, in a facsimile transmitter a continuous tone photograph or the like may be wrapped around a rotating drum which is slowly scanned by a photocell, giving rise to a continuously varying electrical wave form representative of the varying degrees of white, black and gray encountered in scanning the photograph. Synchronizing pulses may also be superimposed to indicate the start or finish of each rotation of the drum.

Figure 6:
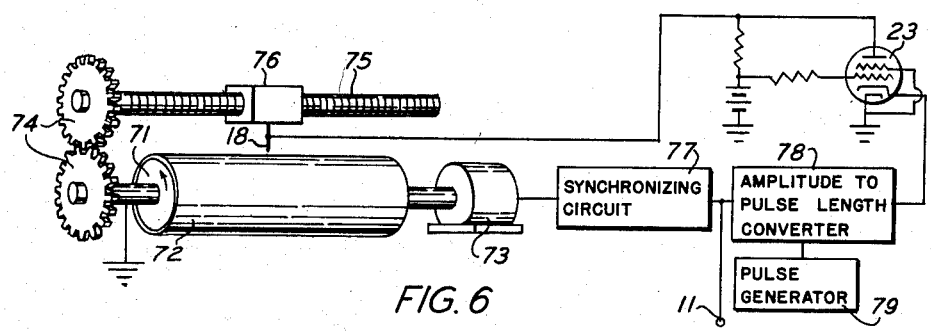
FIG. 6 is a schematic illustration of one form of half-tone recording apparatus.

FIG. 6 shows one form of apparatus according to the invention which is adapted for recording, reproducing and viewing such wave forms. The apparatus includes a rotating electrically conductive drum 71 which is driven by a motor 73 and which in turn drives a lead screw 75 through gears 74. The periphery of drum 71 is covered by an insulating coating or layer 72 which may be of the same character of material described in connection with web 15. Layer 72 may be an integral part of drum 71, but for most applications is preferably a separate piece of material wrapped around and temporarily fastened to drum 71. An insulating block 76 rides on lead screw 75 and carries a pointed electrode 18 which is closely spaced from the surface of drum 71. Signal input 11 is fed to both a synchronizing circuit 77 and to an amplitude-to-pulse-length converter 78. The synchronizing circuit 77, as is known in the art, detects the synchronizing pulses in input 11 if such are employed and controls the operation of motor 73 in accordance with the pulses to produce synchronism between drum 71 and the source of input 11. Converter 78 is connected both to input 11 and to a pulse generator 79 which provides a continuous series of closely-spaced recurrent pulses. The output of converter 78 consists of one pulse of fixed amplitude for each pulse applied thereto by pulse generator 79, the length of each output pulse being controlled by the instantaneous amplitude at input 11. The output pulses from converter 78 are amplified by a pentode-type amplifier 23 which supplies them to electrode 18. Every time a voltage pulse is applied to electrode 18 an electrical discharge is initiated and electrostatic charge is deposited on insulating layer 72 in proportion to the length of the applied pulse. This relationship between charge and pulse length exists because amplifier 23 is of the pentode variety which has a high internal impedance and thus provides output pulses of substantially constant current. The pulses should be in the microsecond range so that drum motion during even the longest of them is substantially zero, and the pulse repetition frequency as determined by pulse generator 79 should be such that the drum movement between pulses is comparable to the distance traveled by electrode 18 during one revolution of drum 71. The pulse repetition frequency should also be substantially greater than the highest frequency to be recorded. It has been found that the size of each area of electrostatic charge produced on insulating layer 72 corresponds to the amount of charge in the area. Accordingly, there is built up on the surface of layer 72 a series of closely spaced "dots" of charge, the physical size of each dot corresponding to the value of input 11 at the time the dot was formed. When insulating layer 72 is developed by any of the techniques previously described, there is formed a pattern of developed areas whose size is substantially that of the individual charge dots. In accordance with the well known principles of half-tone printing, these developed areas give the appearance of a continuous tone image. Where input 11 represents the output of a facsimile transmitter the image developed on insulating layer 72 will be a faithful reproduction of the picture being transmitted.

Figure 7:
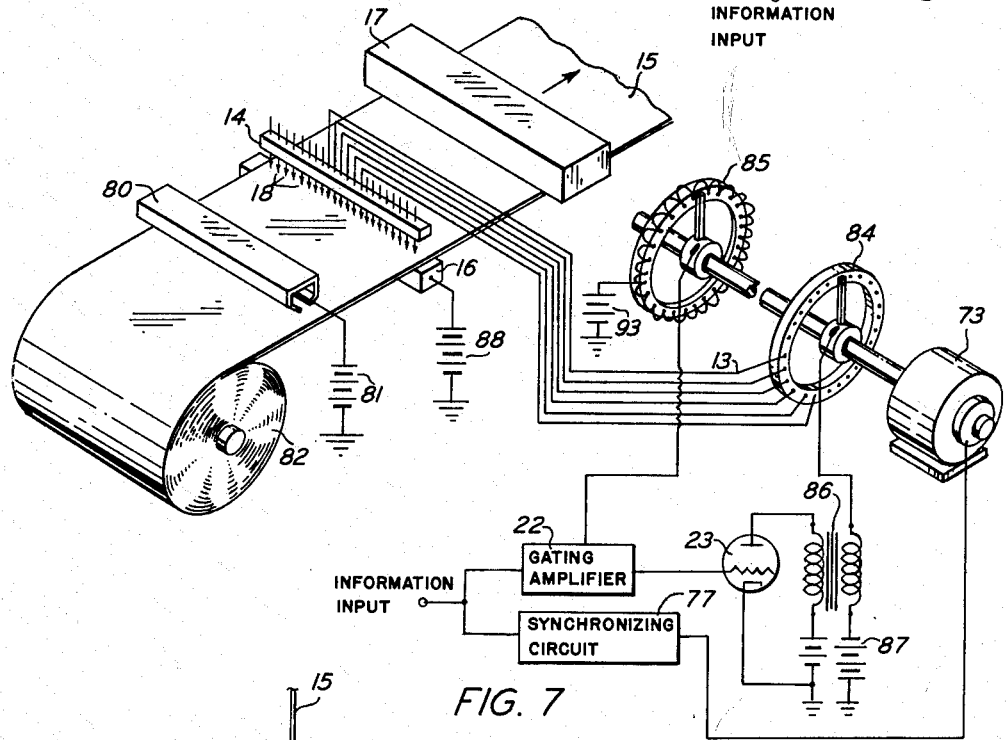
FIG. 7 is a schematic illustration of another form of half-tone recording apparatus.

FIG. 7 is a further form of apparatus for recording and visualizing continuously variable wave forms from facsimile or television transmitters or the like. The apparatus includes a moving insulating web 15 which is fed from a supply roll 82 through a developer 17. An electrode array 14 is positioned closely adjacent to a surface of web 15 and is connected by leads 13 to a commutator 84 which is driven by a motor 73 which also drives a second commutator 85. Input 11 is directed to a synchronizing circuit 77 which controls the operation of motor 73 in the manner already described in connection with FIG. 6. Input 11 is also directed to a gating amplifier 22 and then through a triode amplifier 23 and pulse transformer 86 to commutator 84. Gating amplifier 22 is controlled by pulses derived from battery 93 and commutator 85 which are so arranged that a pulse is supplied to gating amplifier 22 every time commutator 84 makes contact with one of leads 13. There is thus presented to amplifier 23 and thereby to electrodes 18, a series of discrete pulses of fixed length whose voltage is determined by the instantaneous value of input 11. The secondary of pulse transformer 86 is connected to ground through a battery 87 so that the pulse applied to each electrode 18 is the sum of the voltage supplied by battery 87 plus the pulse amplitude delivered across the secondary of transformer 86. Battery 87 may be adjusted so as to be almost, but not quite, sufficient to generate a discharge at electrodes 18 in the absence of a pulse from amplifier 23. When battery 87 is so adjusted the intensity of each discharge at electrodes 18 is substantially proportional to the magnitude of the pulse supplied by amplifier 23 and therefore to the instantaneous amplitude of input 11. It has also been found that the size of the area of electrostatic charge produced on web 15 by each discharge is substantially proportional to the magnitude thereof.

Two further equivalent methods are shown for producing the same results obtained by battery 87. Ground plate 16 may be connected to ground through a battery 88 as shown. This battery similarly may be adjusted to provide just insufficient voltage between ground plate 16 and electrodes 18 to initiate an electrical discharge. Similarly, a corona device 80 may be positioned as shown and connected to a high voltage power supply 81 to deposit a uniform electrostatic charge on web 15 which is just insufficient to initiate electrical discharge between web 15 and electrodes 18. Thus, either of batteries 87 or 88 or corona device 80 may be employed to achieve the same result. Normally, only one such device will be employed. After the areas of electrostatic charge have been formed on web 15, web 15 passes through a developer 17 where the charged areas are transformed into a visible half-tone image.

FIGURES 6 and 7 represent two forms of apparatus suitable for periodically sampling a continuous wave form and directing pulses derived from the wave form samples to suitably positioned electrodes. Other forms of apparatus are capable of performing this function, however, and may be adapted to the present invention. The systems of FIGURES 2 and 3, for example, may be adapted to this form of the invention by providing a suitable pulse generator to supply a series of repetitive pulses to the time reference inputs 10. The system of FIG. 2 affords the additional feature of simultaneously applying suitable pulses to an entire linear array of electrodes.

Figures 8, 9:
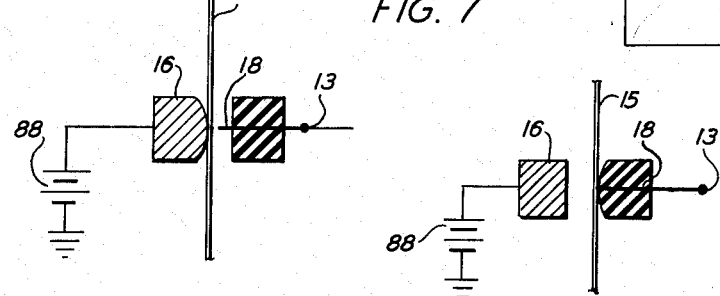
FIGS. 8 and 9 are schematic illustrations of two forms of electrode arrangements for use in the apparatus of FIGS. 6 and 7.

FIGURES 8 and 9 are schematic illustrations of two forms of electrode arrangements for use in the apparatus of FIGURES 6 or 7. FIG. 8 shows in greater detail the electrode arrangement included in FIG. 7. As shown, the face of web 15 passes over the convex surface of ground plate 16 which may, as illustrated, be grounded through a battery 88. Electrodes 18 are positioned closely adjacent to the opposite face of web 15 and attached to connecting leads 13. This arrangement is similar to that of FIG. 1B, and the arrangement of FIG. 1B may be substituted for that of FIG. 8. FIG. 9 shows a different embodiment in which web 15 is maintained in contact with electrodes 18 and is slightly spaced apart from ground plate 16. In this embodiment electrical discharge takes place between web 15 and ground plate 16 and accordingly, the areas of electrostatic charge are formed on the surface of web 15 facing ground plate 16 rather than on the surface contacting electrodes 18.

From the foregoing illustrative specific embodiments, it will be appreciated that by the present invention there is provided a system for analyzing and transducing into visual and directly readable record form, intelligence obtained in electrical amplitude- or pulse-time division form. It is understood that the foregoing specific examples of the system are presented merely by way of example to facilitate a complete understanding of the present invention. Since various equivalents and modifications of the instant embodiments will be apparent to those skilled in the art, such as are within the spirit and scope of the appended claims are considered to be embraced by the present invention.

What is claimed is:

1. A half-tone recorder comprising in combination means to periodically sample a wave-form-containing electrical signal at a sampling frequency substantially greater than the highest frequency to be recorded, means to convert each wave form sample into an electrical impulse corresponding in magnitude to the magnitude of said wave form sample, a dielectric surfaced recording member, means to spatially direct each electrical impulse to a portion of the dielectric surface in relation to the time delay between the wave form sample corresponding to the electrical impulse and a reference time, and means at said portion of the dielectric surface to convert said electrical impulse into a gaseous discharge thereby forming in time dependent spaced relation on said dielectric surface areas of electrostatic charge corresponding in size to the magnitude of said electrical impulses and thus to the magnitude of said wave form samples.

2. A half-tone recorder comprising in combination means to periodically sample a wave-form-containing electrical signal at a sampling frequency substantially greater than the highest frequency to be recorded, means to convert each wave form sample into a substantially constant current electrical impulse corresponding in duration to the magnitude of said wave form sample, a dielectric surfaced recording sheet, means to spatially direct each electrical impulse to a portion of the dielectric surface in relation to the time delay between the wave form sample corresponding to the electrical impulse and a reference time, and means at said portion of the dielectric surface to convert said electrical impulse into a gaseous discharge thereby forming in time dependent spaced relation on said dielectric surface areas of electrostatic charge corresponding in size to the magnitude of said electrical impulses and thus to the magnitude of said wave form samples.

3. A half-tone recorder comprising in combination means to periodically sample a wave-form-containing electrical signal at a sampling frequency substantially greater than the highest frequency to be recorded, means to convert each wave form sample into an electrical impulse corresponding in voltage to the magnitude of said wave form sample, a dielectric surfaced recording sheet, means to spatially direct each electrical impulse to a portion of the dielectric surface in relation to the time delay between the wave form sample corresponding to the electrical impulse and a reference time, and means at said portion of the dielectric surface to convert said electrical impulse into a gaseous discharge thereby forming in time dependent spaced relation on said dielectric surface areas of electrostatic charge corresponding in size to the magnitude of said electrical impulses and thus to the magnitude of said wave form samples.

4. A half-tone recorder comprising in combination means to periodically sample a wave-form-containing electrical signal at a sampling frequency substantially greater than the highest frequency to be recorded, means to convert each wave form sample into an electrical impulse corresponding in magnitude to the magnitude of said wave form sample, a dielectric surfaced cylindrical recording member, means to rotate said recording member about its axis, a pointed electrode positioned closely adjacent to the dielectric surface of said member, means to move said electrode paraxially with said member as said member rotates and at a velocity substantially less than the surface velocity of said member, and means to apply each said electrical impulse to said electrode to form a gaseous discharge thereat thereby forming in time dependent spaced relation on said recording member areas of electrostatic charge corresponding in size to the magnitude of said electrical impulses and thus to the magnitude of said wave form samples.

5. A half-tone recorder comprising in combination means to periodically sample a wave-form-containing electrical signal at a sampling frequency substantially greater than the highest frequency to be recorded, means to convert each wave form sample into an electrical impulse corresponding in magnitude to the magnitude of said wave form sample, a sheet-like dielectric recording member, a linear array of electrical discharge elements, means to move said recording member substantially perpendicularly past said discharge elements, and means to direct each successive electrical impulse to a successive discharge element to form a gaseous discharge thereat thereby forming in time dependent spaced relation on said dielectric surface areas of electrostatic charge corresponding in size to the magnitude of said electrical impulses and thus to the magnitude of said wave form samples.

6. A half-tone recorder comprising in combination means to periodically sample a wave-form-containing electrical signal at a sampling frequency substantially greater than the highest frequency to be recorded, means to convert each wave form sample into an electrical impulse corresponding in magnitude to the magnitude of said wave form sample, a sheet-like dielectric recording member, a linear array of electrical discharge elements, an electrode closely spaced from said linear array of discharge elements and at least coextensive therewith, means to move said recording member substantially perpendicularly between said discharge elements and said electrode, and means to direct each successive electrical impulse to a successive discharge element to form a gaseous discharge thereat thereby forming in time dependent spaced relation on said dielectric surface areas of electrostatic charge corresponding in size to the magnitude of said electrical impulses and thus to the magnitude of said wave form samples.

7. A half-tone recorder comprising in combination means to periodically sample a wave-form-containing electrical signal at a sampling frequency substantially greater than the highest frequency to be recorded, means to convert each wave form sample into an electrical impulse corresponding in voltage to the magnitude of said wave form sample, a sheet-like dielectric recording member, a linear array of electrical discharge elements, means to move said recording member substantially perpendicularly past said discharge elements, means to direct each successive electrical impulse to a successive discharge element to form a gaseous discharge thereat thereby forming in time dependent spaced relation on said recording member areas of electrostatic charge corresponding in size to the magnitude of said electrical impulses, and image development means positioned across said recording member subsequent to said discharge elements to form a visible half-tone image corresponding to said areas of electrostatic charge.

8. A half-tone recorder comprising in combination a sheet-like dielectric recording member, a linear array of electrical discharge elements, means to move said recording member substantially perpendicularly past said discharge elements, means to periodically sample a wave-form-containing electrical signal at a sampling frequency substantially greater than the highest frequency to be recorded, means to convert each wave form sample into an electrical impulse corresponding in amplitude to the magnitude of said wave form sample, storage means to store said electrical impulses, and means to repetitively effect simultaneous parallel transfer of each of the electrical impulses in said storage means to a separate discharge element thereby forming in time dependent spaced relation on said recording member areas of electrostatic charge corresponding in size to the magnitude of said electrical impulses and thus to the magnitude of said wave form samples.

9. A half-tone recorder comprising in combination means to periodically sample a wave-form-containing electrical signal at a sampling frequency substantially greater than the highest frequency to be recorded, means to convert each wave form sample into an electrical impulse corresponding in magnitude to the magnitude of said wave form sample, a sheet-like dielectric recording member, a linear array of electrical discharge elements, an electrode closely spaced from said linear array of discharge elements and at least coextensive therewith, means to move said recording member substantially perpendicularly past and in contact with said electrode and closely spaced apart from said discharge elements, and means to direct each successive electrical impulse to a successive discharge element to form a gaseous discharge thereat thereby forming in time dependent spaced relation on said dielectric surface areas of electrostatic charge corresponding in size to the magnitude of said electrical impulses and thus to the magnitude of said wave form samples.

10. A half-tone recorder comprising in combination means to periodically sample a wave-form-containing electrical signal at a sampling frequency substantially greater than the highest frequency to be recorded, means to convert each wave form sample into an electrical impulse corresponding in magnitude to the magnitude of said wave form sample, a sheet-like dielectric recording member, a linear array of electrical discharge elements, an electrode closely spaced from said linear array of discharge elements and at least coextensive therewith, means to move said recording member past and in contact with said discharge elements and closely spaced apart from said electrode, and means to direct each successive electrical impulse to a successive discharge element to form a gaseous discharge thereat thereby forming in time dependent spaced relation on said dielectric surface areas of electrostatic charge corresponding in size to the magnitude of said electrical impulses and thus to the magnitude of said wave form samples.

References Cited in the file of this patent

UNITED STATES PATENTS

| | | |
|---|---|---|
| 2,471,253 | Toulon | May 24, 1949 |
| 2,474,338 | Toulon | June 28, 1949 |
| 2,558,019 | Toulon | June 26, 1951 |
| 2,848,536 | Toulon | Aug. 19, 1958 |